United States Patent [19]

Yoshida et al.

[11] Patent Number: 5,502,149

[45] Date of Patent: Mar. 26, 1996

[54] POLYISOCYANATE CURING AGENT AND PAINT AND ADHESIVE COMPOSITIONS CONTAINING THE SAME

[75] Inventors: Mitsuhiro Yoshida, Hiratsuka; Susumu Sato; Hisashi Nanno, both of Yokohama, all of Japan

[73] Assignee: Nippon Polyurethane Industry Co., Ltd., Tokyo, Japan

[21] Appl. No.: 234,262

[22] Filed: Apr. 28, 1994

[30] Foreign Application Priority Data

Sep. 29, 1993 [JP] Japan ................... 5-264042

[51] Int. Cl.⁶ .................................. C08G 18/30
[52] U.S. Cl. .................. 528/60; 528/65; 528/67; 528/85; 528/905
[58] Field of Search ................. 528/60, 65, 67, 528/85, 905

[56] References Cited

U.S. PATENT DOCUMENTS

| | | |
|---|---|---|
| 4,187,215 | 2/1980 | Wrightson . |
| 4,576,855 | 3/1986 | Okina et al. . |
| 4,582,888 | 4/1986 | Kasi et al. ................ 528/49 |
| 4,929,724 | 5/1990 | Engbert et al. . |
| 5,043,092 | 8/1991 | Pedain et al. . |
| 5,354,834 | 10/1994 | Yoshida et al. ............. 528/59 |

FOREIGN PATENT DOCUMENTS

| | | |
|---|---|---|
| 0495307A1 | 7/1992 | European Pat. Off. . |
| 63-265970 | 2/1988 | Japan . |
| 2-620 | 9/1990 | Japan . |
| 1402658 | 8/1975 | United Kingdom . |

*Primary Examiner*—James J. Seidleck
*Assistant Examiner*—Duc Truong
*Attorney, Agent, or Firm*—Fish & Richardson

[57] ABSTRACT

The present invention provides a curing agent comprising a polyisocyanate compound obtained from hexamethylene diisocyanate and containing not more than 0.5% by weight of hexamethylene diisocyanate monomer, 21 to 60% weight of uretidine dione dimer and 11 to 40% by weight of isocyanurate cyclic trimer, the uretidine dione dimer and the isocyanurate cyclic trimer being prepared from a product obtained by urethane modification of 0.5 to 15 mole % by mole of total isocyanate groups of the hexamethylene diisocyanate by a dihydric alcohol having at least two hydroxyl groups and a branched hydrocarbon group having 4 to 35 carbon atoms in the molecule, which the side chain hydrocarbon groups in the branched hydrocarbon group have 2 to 33 carbon atoms in total. The curing agent has a low viscosity and a good compatibility with a solvent, and can provides a polyurethane paint or adhesive composition having good curing property, drying property, adhesion strength and weathering resistance.

18 Claims, No Drawings

POLYISOCYANATE CURING AGENT AND PAINT AND ADHESIVE COMPOSITIONS CONTAINING THE SAME

BACKGROUND OF THE INVENTION

1. Field of the Invention

The present invention relates to a curing agent comprising a polyisocyanate compound as the main component the polyisocyanate compound containing a uretidine dione dimer and an isocyanurate cyclic trimer which are prepared from a product obtained by partial urethane modification of hexamethylene diisocyanate, which will be hereinafter referred to as "HDI" and paint and adhesive compositions containing the curing agent.

2. Related Background Art

In the fields of paints, coating and adhesive, larger resource saving, lower public nuisance and higher safety have been considerably required, and paints and adhesives of high solid type, powdery or aqueous system or hot melt type have been regarded as promising paints and adhesives with no public nuisance. Particularly in USA, paints and adhesives of high solid type are more and more used as measures to reduce VOC (volatile organic compounds). In Japan, conversion to the high solid type is not so remarkable as in USA, but use of the high solid type has been taken into consideration owing to recent activities of local self-governing bodies toward environmental protection, level-up of paints now in use by conversion to the high solid type, and furthermore trends to a guarantee of quality of, for example, USA-made cars and Japan-made cars in the automobile industry.

Polyurethane paints and adhesives of one-package type and two-package type comprising an HDI-based polyisocyanate as a curing agent and acrylic polyol or polyester polyol as the main component have distinguished weathering resistance, chemical resistance, abrasion resistance, etc. and have been used in the fields of automobile and architecture outer coating and bonding. From the foregoing viewpoints even in such a polyurethane field a system of high solid type, in other words, low viscosity type, has been also required for reducing the necessary amounts of solvents for diluting the actual coating viscosity. Thus, an isocyanurate type has been recently more and more used owing to the good weathering resistance and the low viscosity as an HDI-based polyisocyanate curing agent rather than the urethane oligomer type based on polyfunctional alcohols.

However, the isocyanurate type is in a structure of three molecules of HDI with a tendency to form a higher molecular weight compound and thus has a limit to formation of a lower molecular weight compound. To obtain a lower molecular weight compound, the structure must be a uretidine dione structure based on two molecules of HDI, and such a lower molecular weight type inevitably leads to a decrease in the number of functional groups, resulting in poor curing property and drying property, that is, poor workability. When such a low molecular weight type is used in a two-component system, its compatibility with other resin is lowered and the service conditions are inevitably restricted.

SUMMARY OF THE INVENTION

To solve the above-mentioned problems, thereby lowering the viscosity and improving poor curing property and poor drying property as well as the poor compatibility with a solvent or other resin, the present inventors have found that it is effective to introduce into HDI a urethane bond based on a carbon branched type dihydraulic alcohol, while utilizing an effect of uretidine dione structure, i.e. lower molecular weight structure than the isocyanurate structure, upon formation of lower molecular weight compound, and have established the present invention.

The present invention provides a polyisocyanate curing agent, which comprises a polyisocyanate compound obtained from HDI and containing not more than 0.5% by weight of HDI monomer, 21 to 60% by weight of uretidine dione dimer and 11 to 40% by weight of isocyanurate cyclic trimer, the uretidine dione dimer and the isocyanurate cyclic trimer being prepared from a product obtained by urethane modification of 0.5 to 15 mole % of total isocyanate groups of the HDI by a dihydric alcohol having at least two hydroxyl groups and a branched hydrocarbon group having 4 to 35 carbon atoms in the molecule, which the side chain hydrocarbon groups in the branched hydrocarbon group have 2 to 33 carbon atoms in total.

Furthermore, the present invention provides a polyurethane paint or adhesive composition, which comprises the above-mentioned polyisocyanate compound and a polyhydric hydroxyl compound, where a molar ratio of isocyanate groups in the polyisocyanate compound to hydroxyl groups in the polyhydric hydroxyl compound is in a range of 9:1 to 1:9.

DETAILED DESCRIPTION OF THE PREFERRED EMBODIMENTS

A urethane-modifying agent for the present polyisocyanate compound is a dihydric alcohol having at least two hydroxyl groups and a branched hydrocarbon group having 4 to 35 carbon atoms in the molecule, which the side chain hydrocarbon groups in the branched hydrocarbon group have 2 to 33 carbon atoms in total. These conditions are necessary for obtaining effective drying property and compatibility when a paint or adhesive composition is prepared. The dihydric alcohol for use in the present invention is a compound having two hydroxyl groups and one or more hydrocarbon groups existing between the two hydroxyl groups, at least whose residue or carbon atoms are linearly bonded to the two hydroxyl groups as a dihydric alcohol molecular structure (i.e. branched hydrocarbon group). dihydric alcohols having at least two branched structures or a long branch hydrocarbon group are preferable, and particularly dihydric alcohols having a molecular weight of 100 to 1,000 are preferable.

The dihydric alcohol for use in the present invention includes, for example, neopentyl glycol, 2,2-diethyl-1,3-propanediol, 2-n-butyl-2-ethyl-1,3-propanediol, 2,2,4-trimethyl-1,3-pentanediol, 2-ethyl-1,3-hexanediol, 2-n-hexadecane-1,2-ethyleneglycol, 2-n-eicosane-1,2-ethyleneglycol, 2-n-octacosane-1,2ethyleneglycol, 2,2-dimethyl-3-hydroxypropyl-2,2-dimethyl-3-hydroxypropionate, bisphenol A hydride, dipropyleneglycol, etc.

It is necessary that a urethanization ratio of starting material HDI is 0.5 to 15 mole % on the basis of total isocyanate groups. Below 0.5 mole %, no effective introduction of urethane bond is obtained, resulting in unsatisfactory drying property or poor compatibility with a solvent or other resin when a paint or adhesive composition is prepared or partial gel formation at synthesis. On the other hand, above 15 mole %, the feature, of the resulting isocyanurate structure and uretidine dione structure cannot be fully exhibited, and a decrease in the viscosity and an increase in the weathering resistance cannot be attained when made into a paint or an adhesive composition.

Since the uretidine dione dimer has a lower molecular weight than that of the isocyanurate cyclic trimer and besides the uretidine dione dimer and the cyanurate cyclic trimer their higher molecular weight compounds are formed with the progress of reaction, it is necessary that the present polyisocyanate compound contains 21 to 60% by weight of uretidine dione dimer and 11 to 40% by weight of isocyanurate cyclic trimer. When the content of uretidine dione dimer is less than 21% by weight and the content of isocyanurate cyclic trimer is higher than 40% by weight, a decrease in the viscosity, as desired in the present invention, cannot be achieved. The remainder in the present polyisocyanate compound is higher polymers than the dimer and the trimer.

In order to obtain a polyisocyanate compound for the curing agent according to the present invention, it is preferable conduct reactions capable forming the uretidine dione structure and the isocyanurate structure at the same time. In order to obtain a polyisocyanate curing agent of low viscosity, as desired in the present invention, it is necessary to terminate the reactions at an early stage, thereby to suppress formation of higher molecular weight compounds to a minimum.

An effective catalyst for obtaining a polyisocyanate compound containing the uretidine dione dimer and the isocyanurate cyclic trimer at the same time according to the present invention includes phosphines such as triethylphosphine, dibutylethylphosphine, tri-n-propylphosphine, triisopropylphosphine, tri-n-butylphosphine, triisobutylphosphine, tri-t-butylphosphine, triamylphosphine, trioctylphosphine, tribenzylphosphine and benzylmethylphosphine.

When the reactions reach the desired conversions, the reactions are terminated by addition of a terminating agent such as phosphoric acid or methyl p-toluenesulfonate, and free unreacted HDI (monomer) present in the reaction mixture is removed to a residual content of 0.5% by weight at most by an appropriate means such as extraction with n-hexane or thin film evaporation at 120° to 140° C. under high vacuum, e.g. 0.01 to 0.1 Torr.

In the formation of the present polyisocyanate compound, the reactions to form the isocyanurate and uretidine dione can smoothly proceed by urethanizing a portion of the entire isocyanate groups of HDI, that is, by the catalytic effects of urethane bonds, without forming partial gelation products (higher molecular weight compounds). The catalytic effects of the urethane bonds can be equivalently attained when the urethane-forming reaction is carried out even before or during the formation of isocyanurate and uretidine dione.

Usually, these reactions can be carried out in at least one inert solvent usually used in the polyurethane industry, selected from, for example, aromatic solvents such as toluene, xylene, Swazol (trademark of an aromatic hydrocarbon solvent made by Cosmo Oil K.K., Japan) and Solvesso (trademark of an aromatic hydrocarbon solvent made by Esso Chemical K.K., Japan), ketone-based solvents such as methylethylketone, methylisobutylketone and cyclohexanone; ester-based solvents such as ethyl acetate, butyl acetate and isobutyl acetate; glycol ether ester-based solvents such as ethyleneglycol ethylether acetate, propyleneglycol methylether acetate, 3-methyl-3-methoxybutyl acetate and ethyl-3-ethoxypropionate; and ether-based solvents such as tetrahydrofuran and dioxane, and thus the viscosity can be adjusted according to reaction conditions.

The reaction temperature is selected usually from a range of 50° to 90° C.

The polyhydric hydroxyl compound for use in the present paint and adhesive composition is a polyhydric hydroxyl compound having at least two hydroxyl groups in the molecule, and includes, for example, saturated or unsaturated polyesterpolyol, polycaprolactonepolyol, saturated or unsaturated, oil-modified or fatty acid-modified alkydpolyol, aminoalkydpolyol, polycarbonatepolyol, acrylpolyol, polyetherpolyol, epoxypolyol, fluorine-containing polyol, saturated or unsaturated polyester resin, polycaprolactone resin, saturated or unsaturated, oil-modified or fatty acid-modified alkyd resin, aminoalkyd resin, polycarbonate resin, acrylic resin, polyether resin, epoxy resin, polyuethane resin, cellulose acetate butyrate and fluorine-containing resin, among which saturated or unsaturated polyester resin, saturated or unsaturated, oil-modified or fatty acid-modified alkyd resin and acrylic resin are particularly preferable as polyhydric hydroxyl compounds for use in the paint and the adhesive composition from the viewpoints of film properties such as gloss, apparent thickness, hardness, flexibility, durability, etc.; workabilities such as drying property, curing property, etc., and economy.

The above term "acrylpolyol" means copolymers obtained by the combination of hydroxy-alkyl-(meth)acrylates (1) having a hydroxy group and alkyl-(meth)acrylates (2) and/or other compounds (3) capable of co-polymerization. The following compounds are exemplified as the above hydroxy-alkyl-(meth)acrylates (1): hydroxymethyl-(meth)acrylate, hydroxyethyl-(meth)acrylate, hydroxypropyl-(meth)acrylate, hydroxybutyl-(meth)acrylate, N-methylol-(meth)acrylate, diethyleneglycol-mono-(meth)acrylate, and ethylenical monomers having a hydroxyl group. Typical examples of alkyl-(meth)acrylates (2) are methyl (meth)acrylate, ethyl (meth)acrylate, propyl (meth)acrylate, butyl (meth)acrylate, isopropyl (meth)acrylate, isobutyl (meth)acrylate, 2-ethyl-hexyl (meth)acrylate, lauryl (meth)acrylate, n-octyl (meth)acrylate, n-dodecyl (meth)acrylate and the like. Further, typical examples of other compounds (3) having an ethylenic double bond and capable of co-polymerization are ethylenic monomer having a corboxyl group such as (meth)acrylic acid, crotonic acid, itaconic acid, fumaric acid and maleic acid, styrene, dibutyl fumarate, dibutyl maleate, aryl alcohol and the like.

In the present paint and adhesive composition, a molar ratio of the isocyanate groups in the polyisocyanate compound to the hydroxyl groups in the polyhydric hydroxyl compound is in a range of 9:1 to 1:9, preferably 6:4 to 4:6.

The present paint and adhesive composition according to the present invention can further contain various pigments and additives usually used in the paint industry or the adhesive industry beside the above-mentioned solvent.

Still furthermore, the present paint and adhesive composition can be applied by the ordinary application procedure so far employed, for example, by an airless sprayer, an air sprayer, an electrostatic coater, a roll coater, a knife coater, a brush, a gun, a trowel, etc.

The present polyisocyante compound is prepared by carrying out the uretidine-forming reaction and isocyanuate-forming reaction by use of a urethane-modified polyisocyanate in which isocyanate groups in a starting polyisocyanate material are partially urethanized. Therefore, a uretidine dione structure and an isocyanurate structure can be readily formed. Accordingly, the present polyisocyanate curing agent containing the polyisocyanate compound has a low viscosity and a good compatibility with a solvent and a polyhydric hydroxyl compound. A polyurethane paint and adhesive composition of high solid type having a good curing property, a good drying property, a good bonding strength, a good weathering resistance, etc. can be obtained from the present polyisocyanate curing agent, and can be applied to a broad range of materials such as metals, plastics, concrete, wood, etc. with a good workability and with considerable contribution to larger resource saving and lower public nuisance. The present paint or adhesive composition can provide a larger application thickness by less run times of application than the conventional paint or adhesive, and thus can improve the pinhole, foam and sag limits.

EXAMPLES AND COMPARATIVE EXAMPLES

The present invention will be illustrated in detail below, referring to Examples and Comparative Examples, which are not limitative of the present invention, where "parts" is by weight and % is by weight, unless otherwise mentioned.

Examples 1 to 10 and Comparative Examples 1 to 5

HDI having an isocyanate (NCO) content of 49.9 and a solid content of 100% (made of Nippon Polyurethane Industry K.K.) and dihydric alcohol were charged into a four-necked flask provided with a stirrer, a thermometer and a reflex condenser, and heated to 50°–60° C., with stirring. Urethanization reaction was carried out until the desired NCO content was obtained. Then, reactions to form uretidine dione and isocyanurate were carried out by adding a catalyst to the reaction mixture, and when the desired NCO content (NCO content at the termination of reactions) was reached, a terminating agent was added to the reaction mixture to discontinue the reactions, whereby a pale yellow liquid reaction mixture was obtained. Then, unreacted HDI was removed therefrom by the thin film distillation at 120°–140° C. under 0.01–0.05 Torr, whereby a product was obtained.

The starting materials, their charged amounts and the results are summarized in Tables 1, 2 and 3.

The remaining free HDI content was determined by means of the gas chromatography. Uretidine dione dimer content and isocyanurate cyclic trimer content were determined from calibration curves based on area percentages of the respective peaks obtained by means of the gel permeation chromatography based on differential refractometrical detection. Yield after the distillation was determined from a ratio of the weight after the distillation to that before the distillation.

TABLE 1

| | | Example | | | | |
|---|---|---|---|---|---|---|
| | | 1 | 2 | 3 | 4 | 5 |
| HDI (parts) | | 1000 | 1000 | 1000 | 1000 | 1000 |
| Dihydric alcohol (parts) | Neopentyl glycol | 21.7 | 5.0 | | | |
| | 2-n-butyl-2-ethyl-1,3-propanediol | | | 39.8 | 20.9 | 7.5 |
| Catalyst (parts) | Tributyl-phosphine | 1.0 | 1.0 | 1.0 | 1.0 | 1.0 |
| Terminating agent (parts) | Methyl p-toluenesulfonate | | | 1.1 | 1.1 | 1.1 |
| | Phosphoric acid | 0.6 | 0.6 | | | |

TABLE 1-continued

| | Example | | | | |
|---|---|---|---|---|---|
| | 1 | 2 | 3 | 4 | 5 |
| NCO content (%) at the reaction termination | 37.1 | 42.1 | 33.5 | 39.0 | 42.5 |
| yield after distillation (%) | 35 | 23 | 38 | 30 | 25 |
| Product | | | | | |
| NCO content (%) | 21.2 | 22.3 | 20.9 | 21.9 | 22.2 |
| Solid content (%) | 100 | 100 | 100 | 100 | 100 |
| Viscosity (cSt/25° C.) | 215 | 70 | 296 | 170 | 73 |
| Free HDI content (%) | 0.2 | 0.1 | 0.1 | 0.2 | 0.3 |
| Urethanization ratio (by mole %) | 10 | 3.5 | 11 | 7.3 | 3.1 |
| Uretidine dione dimer content (%) | 32 | 49 | 30 | 43 | 47 |
| Isocyanurate cyclic trimer content (%) | 28 | 32 | 28 | 31 | 31 |

TABLE 2

| | | Example | | | | |
|---|---|---|---|---|---|---|
| | | 6 | 7 | 8 | 9 | 10 |
| HDI (parts) | | 1000 | 1000 | 1000 | 1000 | 1000 |
| Dihydric alcohol (parts) | 2,2,4-tri-methyl-1,3-pentanediol | 48.7 | 26.1 | 3.4 | | |
| | Hydrogenated bisphenol A | | | | 40.1 | 1.9 |
| Catalyst (parts) | Triamyl-phosphine | 1.0 | 1.0 | 1.0 | 2.0 | 2.0 |
| Terminating agent (parts) | Methyl p-toluenesulfonate | | | | 1.8 | 1.8 |
| | Phosphoric acid | 0.5 | 0.5 | 0.5 | | |
| NCO content (%) at the reaction termination | | 32.7 | 37.5 | 43.3 | 37.7 | 45.8 |
| Yield after distillation (%) | | 40 | 33 | 17 | 33 | 13 |
| Product | | | | | | |
| NCO content (%) | | 20.8 | 21.4 | 22.9 | 21.3 | 23.2 |
| Solid content (%) | | 100 | 100 | 100 | 100 | 100 |
| Viscosity (cSt/25° C.) | | 450 | 210 | 64 | 200 | 51 |
| Free HDI content (%) | | 0.2 | 0.2 | 0.3 | 0.1 | 0.3 |
| Urethanization ratio (by mole %) | | 14 | 9.1 | 2.3 | 8.5 | 1.0 |
| Uretidine dione dimer content (%) | | 28 | 33 | 54 | 35 | 56 |
| Isocyanurate cyclic trimer content (%) | | 26 | 29 | 33 | 31 | 36 |

TABLE 3

| | | Comparative Example | | | | |
|---|---|---|---|---|---|---|
| | | 1 | 2 | 3 | 4 | 5 |
| HDI (parts) | | 1000 | 1000 | 1000 | 1000 | 1000 |
| Dihydric alcohol (parts) | 1,3-butanediol | | | | 4.2 | |
| | 2-methyl-1,3-propanediol | | | | 13.4 | |
| | 1,6-hexanediol | | | | | 6.5 |
| Catalyst | Tributyl- | | 1.0 | | 1.0 | 1.0 |

TABLE 3-continued

| | | Comparative Example | | | | |
|---|---|---|---|---|---|---|
| | | 1 | 2 | 3 | 4 | 5 |
| (parts) | phosphine Triamyl-phosphine | | | 2.0 | | |
| | Tetra-methyl-ammonium hydroxide | 0.1 | | | | |
| Termi-nating agent | Methyl p-toluene-sulfonate | | 1.1 | 1.8 | 1.1 | 1.1 |
| (parts) | Phosphoric acid | 0.1 | | | | |
| NCO content (%) at the reaction termination | | 46.3 | 41.5 | 30.3 | 39.4 | 43.2 |
| Yield after distillation (%) | | 20 | 30 | 55 | 35 | 23 |
| Product | | | | | | |
| NCO content (%) | | 23.5 | 22.5 | 18.7 | 21.6 | 22.9 |
| Solid content (%) | | 100 | 100 | 100 | 100 | 100 |
| Viscosity (cSt/25° C.) | | 1380 | 80 | 650 | 230 | 70 |
| Free HDI content (%) | | 0.1 | 0.2 | 0.1 | 0.3 | 0.2 |
| Urethanization ratio (by mole %) | | 0 | 0 | 1.4 | 7.2 | 4.0 |
| Uretidine dione dimer content (%) | | 1 | 48 | 20 | 35 | 50 |
| Isocyanurate cyclic trimer content (%) | | 71 | 31 | 20 | 47 | 30 |

Tolerance

To 5 g of one of the reaction products obtained in Examples 1 to 10 and Comparative Examples 1 to 5 was portionwise added one of various solvents given in Tables 4 and 5 by a burette, and the resulting mixture was thoroughly shaked. The time when the mixture turned turbid by the shaking was regarded as an end point and the required ml of the solvent up to the end point was measured. Then, tolerances (solvent dilutability) to the various solvents were determined according to the following formula:

Tolerance=required ml of a given solvent/amount of a sample (=5 g) The higher the tolerance, the better the solvent dilutability. The results are shown in Tables 4 and 5.

Compatibility with other resins

One of the reaction products obtained in Examples 1 to 10 and Comparative Examples 1 to 5 was mixed with one of various resins listed in Tables 4 and 5 in a mixing ratio of 1:1 by weight, and the resulting liquid mixture was applied onto a glass plate, and when the solvent was completely evaporated at 40° C. away under reduced pressure over one hour. The compatibility was determined by observing the appearance of the resulting film. The results are also given in Tables 4 and 5, wherein Solvesso 100 is an aromatic hydrocarbon solvent made by Exon Chemical K.K., Japan; Nippolan 125 is a polyesterpolyol having a hydroxyl number of 170 mg KOH/g and a solid content of 65%, made by Nippon Polyurethane Industry K.K., Japan; and Lumiflon LF-200 is a fluorine-containing polyol having a hydroxyl number of 32 mg KOH/g and a solid content of 60%, made by Asahi Glass K.K., Japan.

TABLE 4

| | Example | | | | | | | |
|---|---|---|---|---|---|---|---|---|
| | 1 | 2 | 3 | 4 | 5 | 6 | 7 | 8 |
| Tolerance | | | | | | | | |
| Toluene | >100 | >100 | >100 | >100 | >100 | >100 | >100 | >100 |
| Solvesso 100 | >100 | >100 | >100 | >100 | >100 | >100 | >100 | >100 |
| Compatibility with other resins | | | | | | | | |
| Nippolan 125 | Good | Good | Good | Good | Good | Good | Good | Good |
| Cellulose acetate butyrate | Good | Good | Good | Good | Good | Good | Good | Good |
| Lumiflon LF-200 | Good | Good | Good | Good | Good | Good | Good | Good |

TABLE 5

| | Example | | Comparative Example | | | | |
|---|---|---|---|---|---|---|---|
| | 9 | 10 | 1 | 2 | 3 | 4 | 5 |
| Tolerance | | | | | | | |
| Toluene | >100 | >100 | 60 | 40 | 45 | >100 | 43 |
| Solvesso 100 | >100 | >100 | 25 | 10 | 20 | 50 | 16 |
| Compatibility with other | | | | | | | |

TABLE 5-continued

|  | Example | | Comparative Example | | | | |
|---|---|---|---|---|---|---|---|
|  | 9 | 10 | 1 | 2 | 3 | 4 | 5 |
| resins |  |  |  |  |  |  |  |
| Nippolan 125 | Good | Good | Good | Poor | Poor | Good | Good |
| Cellulose acetate butylate | Good | Good | Good | Poor | Poor | Poor | Poor |
| Lumiflon LF-200 | Good | Good | Good | Poor | Poor | Poor | Poor |

Examples 11 to 22 and Comparative Examples 6 to 12

Paint compositions and adhesive compositions as shown in Tables 6, 7 and 8 were prepared from the reaction products (polyisocyanate compounds) obtained in Examples 1 to 10 and Comparative Examples 1 to 5. In Tables 6, 7 and 8, Acrydick A-801 is an acrylic polyol having a hydroxyl number of 50 mg KOH/g and a solid content of 50%, made by Dainippon Ink Kagaku Kogyo K.K., Japan; Nippolan 1100 is a polyesterpolyol having a hydroxyl number of 213 mg KOH/g and a solid content of 100%, made by Nippon Polyurethane Industry K.K., Japan; an Barnock DE-140-70 is an alkyd polyol having a hydroxyl number of 95 mg KOH/g and a solid content of 70%, made by Dainippon Ink Kagaku Kogyo K.K., Japan.

TABLE 6

|  |  | Example | | | | | |
|---|---|---|---|---|---|---|---|
|  |  | 11 | 12 | 13 | 14 | 15 | 16 |
| Polyisocyanate compound (parts) | Example 1 | 130.4 |  |  |  |  |  |
|  | Example 2 |  | 125.6 |  |  |  |  |
|  | Example 3 |  |  | 131.9 |  |  |  |
|  | Example 4 |  |  |  | 127.4 |  |  |
|  | Example 5 |  |  |  |  | 126.1 |  |
|  | Example 6 |  |  |  |  |  | 217.0 |
| Polyhydric hydroxyl compound (parts) | Acrydick A-801 | 739.2 | 748.8 | 736.2 | 745.2 | 747.8 |  |
|  | Nippolan 1100 |  |  |  |  |  | 283.00 |
| Solvent (parts) | Butyl acetate | 130.4 | 125.6 | 131.9 | 127.4 | 126.1 | 500.0 |
| Total (parts) |  | 1000 | 1000 | 1000 | 1000 | 1000 | 1000 |

TABLE 7

|  |  | Example | | | | | |
|---|---|---|---|---|---|---|---|
|  |  | 17 | 18 | 19 | 20 | 21 | 22 |
| Polyisocyanate compound (parts) | Example 7 | 213.5 |  |  |  |  |  |
|  | Example 8 |  | 205.2 |  |  |  |  |
|  | Example 9 |  |  | 161.5 |  |  |  |
|  | Example 10 |  |  |  | 152.3 |  |  |
|  | Example 5 |  |  |  |  | 75.6 |  |
|  | Example 6 |  |  |  |  |  | 130.2 |
| Polyhydric hydroxy compound (parts) | Acrydic A-801 |  |  |  |  | 448.7 |  |
|  | Nippolan 1100 | 286.5 | 294.8 |  |  |  | 169.8 |
|  | Barnock DE-140-70 |  |  | 483.6 | 496.8 |  |  |
| Solvent (parts) | Butyl acetate | 500.0 | 500.0 | 354.9 | 350.9 | 275.7 | 500.0 |
| Pigment (parts) | Titanium oxide |  |  |  |  | 200.0 | 200.0 |
| Total (parts) |  | 1000 | 1000 | 1000 | 1000 | 1000 | 1000 |

TABLE 8

| | | Comparative Example | | | | | | |
|---|---|---|---|---|---|---|---|---|
| | | 6 | 7 | 8 | 9 | 10 | 11 | 12 |
| Polysiocyanate compound (parts) | Comp. Ex. 1 | 202.1 | | | | | | |
| | Comp. Ex. 2 | | 207.4 | | | | | |
| | Comp. Ex. 3 | | | 143.0 | | | | |
| | Comp. Ex. 4 | | | | 128.7 | | | |
| | Comp. Ex. 5 | | | | | 153.7 | | |
| | Comp. Ex. 2 | | | | | | 124.4 | |
| | Comp. Ex. 3 | | | | | | | 85.8 |
| Polyhydric hydroxy compound (parts) | Acrydick A-801 | | | 714.0 | 742.6 | | | 428.5 |
| | Nipplan 1100 | 297.9 | 292.6 | | | | 175.6 | |
| | Barnock DE-140-70 | | | | | 494.7 | | |
| Solvent (parts) | Butyl acetate | 500.0 | 500.0 | 143.0 | 128.7 | 351.6 | 500.0 | 285.7 |
| Pigment (parts) | Titanium oxide | | | | | | 200.0 | 200.0 |
| Total (parts) | | 1000 | 1000 | 1000 | 1000 | 1000 | 1000 | 1000 |

COATING FILM TEST

The thus obtained compositions were applied to each of steel plates defatted by trichloroethylene (JIS G3141 (3141-SB), specification PF-1077, made by Nihon Test Panel Kogyo K.K., Japan; hereinafter referred to as Bonderized Steel Plates) and left standing in an atmosphere at 20° C. and 65% RH for one week to form films having a thickness of 40 to 50 μm (in the dry state).

Then, the appearance, gloss, drying property, pencil hardness and impact resistance of the thus obtained films were measured according to JIS K5400, where the impact resistance test was carried out under conditions of ½ inch and 1 Kg. The results are shown in Tables 9 and 10.

TABLE 9

| | Example | | | | | | | | | |
|---|---|---|---|---|---|---|---|---|---|---|
| | 11 | 12 | 13 | 14 | 15 | 16 | 17 | 18 | 19 | 20 |
| Film appearance | Good | Good | Good | Good | Good | Good | Good | Good | Good | Good |
| Gloss | 90 | 91 | 93 | 90 | 92 | 89 | 89 | 90 | 91 | 91 |
| Drying property (20° C.) | | | | | | | | | | |
| Set to touch (min.) | 30 | 40 | 28 | 38 | 40 | 29 | 31 | 48 | 31 | 50 |
| Curing drying (hr.) | 22 | 32 | 22 | 29 | 30 | 21 | 24 | 38 | 23 | 34 |
| Drying property (60° C.) | | | | | | | | | | |
| Set to touch (min.) | 7 | 8 | 6 | 8 | 8 | 6 | 8 | 12 | 7 | 13 |
| Curing drying (min.) | 200 | 200 | 150 | 210 | 190 | 160 | 200 | 280 | 200 | 400 |
| Pencil hardness | H | H | H | H | F | H | H | F | H | F |
| Impact resistance (cm) | 50 | 50 | 53 | 52 | 58 | 50 | 50 | 61 | 52 | 60 |

TABLE 10

| | Example | | Comparative Example | | | | | | |
|---|---|---|---|---|---|---|---|---|---|
| | 21 | 22 | 6 | 7 | 8 | 9 | 10 | 11 | 12 |
| Film appearance | Good | Good | Good | Good | Good | Good | Good | Good | Good |

TABLE 10-continued

|  | Example | | Comparative Example | | | | | | |
| --- | --- | --- | --- | --- | --- | --- | --- | --- | --- |
|  | 21 | 22 | 6 | 7 | 8 | 9 | 10 | 11 | 12 |
| Gloss | 90 | 91 | 90 | 91 | 88 | 89 | 91 | 90 | 88 |
| Drying property (20° C.) | | | | | | | | | |
| Set to touch (min.) | 23 | 17 | 160 | 200 | 90 | 70 | 130 | 120 | 40 |
| Curing drying (hr.) | 11 | 7 | >48 | >48 | >48 | >48 | >48 | >48 | 33 |
| Drying property (60° C.) | | | | | | | | | |
| Set to touch (min.) | 3 | 3 | 18 | 25 | 9 | 7 | 14 | 12 | 6 |
| Curing drying (min.) | 100 | 80 | 800 | 950 | 600 | 500 | 900 | 550 | 300 |
| Pencil hardness | H | H | F | F | H | H | F | H | H |
| Impact resistance (cm) | 35 | 30 | 60 | 67 | 35 | 50 | 64 | 35 | 25 |

Example 23

The adhesive composition obtained in Example 11 was subjected to the following adhesion test.

The adhesive composition (varnish) were applied to polyurethane RIM (reactive injection molding) moldings plates, FRP plates, ABS plates, and Bonderized steel plates, each having a thickness of 3 mm and defatted with trichloroethylene, to a film thickness of 40 to 50 μm (in the dry state) and subjected to preliminary drying at 50° C. for 5 minutes to evaporate the solvent off the films. Then, the plates of the same kind were placed one upon another while preventing air bubble intrusion between the plates and pressed under 25 Kg/cm². Then, the pressed plates were left standing under the same conditions as those for the film test to obtain dry films.

Then, the dry films were cut to pieces, 25 mm wide, and the cut pieces were subjected to determination of adhesion strength (Kg/25 mm) at a pulling rate of 100 mm/min. according to JIS K6854 by Tensilon UTM-500, made by Orientech K.K., Japan. The results are shown in Table 11.

Comparative Example 13

The adhesive composition obtained in Comparative Example 13 was subjected to an adhesion test under the same conditions as in Example 23, and the results are shown in Table 11.

TABLE 11

|  | Example 23 | Comp. Ex. 13 |
| --- | --- | --- |
| Adhesion strength | | |
| RIM plate | 29/A | 19/B |
| FRP plate | 44/A | 26/B |
| ABS plate | 30/A | 17/B |
| Bonderized steel plate | 39/B | 18/B |

In Table 11, A shows a material failure and B shows a cohesive failure.

What is claimed is:

1. A polyisocyanate curing agent which comprises a polyisocyanate compound obtained from hexamethylene diisocyanate and containing not more than 0.5% by weight of hexamethylene diisocyanate monomer, 21 to 60% by weight of uretidine dione dimer and 11 to 40% by weight of isocyanurate cyclic trimer, the uretidine dione dimer and the isocyanurate cyclic timer being prepared form a product obtained by urethane modification of 0.5 to 15% of total isocyanate groups of hexamethylene diisocyanate before or during dimer and trimer formation by an alcohol having at least two hydroxyl groups and a branched hydrocarbon group consisting of two side chains, wherein the branched hydrocarbon group has a total of 4 to 35 carbon atoms, 2 to 33 of which carbons are present in the two side chains.

2. The polyisocyanate curing agent of claim 1 wherein the alcohol is dihydric.

3. The polyisocyanate curing agent of claim 2 wherein the dihydric alcohol has a molecular weight of 100 to 1,000.

4. The polyisocyanate curing agent of claim 1 wherein the uretidine dione dimer and the isocyanurate cyclic trimer are prepared using a phosphine catalyst.

5. The polyisocyanate curing agent of claim 4 wherein the phosphine catalyst is selected from the group consisting of triethylphosphine, dibutylethylphosphine, tri-n-propylphosphine, triisopropylphosphine, tri-n-butylphosphine, triisobutylphosphine, tri-t-butylphosphine, triamylphosphine, trioctylphosphine, tribenzylphosphine and benzylmethylphosphine.

6. The polyisocyanate curing agent of claim 1 wherein urethane modification of the hexamethylene diisocyanate occurs before the uretidine dione dimer and isocyanurate cyclic trimer are formed.

7. The polyisocyanate curing agent of claim 1 wherein the polyisocyanate curing agent is formed in the presence of at least one inert solvent.

8. The polyisocyanate curing agent of claim 7 wherein the solvent is selected from the group consisting of aromatic solvents, ketone-based solvents, ester-based solvents, glycol ether ester-based solvents, and ether-based solvents.

9. The polyisocyanate curing agent of claim 1 wherein the polyisocyanate curing agent is formed at a temperature ranging from about 50° to 90° C.

10. A polyurethane paint composition comprising a polyisocyanate compound obtained from hexamethylene diisocyanate and containing not more than 0.5% by weight of hexamethylene diisocyanate monomer, 21 to 60% by weight of uretidine dione dimer and 11 to 40% by weight of isocyanurate cyclic trimer, the uretidine dione dimer and the isocyanurate cyclic trimer being prepared from a product obtained by urethane modification of 0.5 to 15 mole % of total isocyanate groups of hexamethylene diisocyanate before or during dimer and trimer formation by an alcohol having at least two hydroxyl groups and a branched hydrocarbon group consisting of two side chains, wherein the branched hydrocarbon group has a total of 4 to 35 carbon atoms, 2 to 33 of which carbons are present in the two side chains, and a polyhydric hydroxyl compound, where a molar ratio of isocyanate groups in the polyisocyanate compound to hydroxyl groups in the polyhydric hydroxyl compound is in a range of 9:1 to 1:9.

11. The polyurethane paint composition of claim 10 wherein the alcohol is dihydric.

12. The polyurethane paint composition of claim 11 wherein the dihydric alcohol has a molecular weight of 100 to 1,000.

13. The polyurethane paint composition of claim 10 wherein the polyhydric hydroxyl compound is selected from the group consisting of saturated polyester resin, unsaturated polyester resin, oil-modified alkyd resin, fatty acid-modified alkyd resin, oil-modified acrylic resin and fatty acid-modified acrylic resin.

14. The polyurethane paint composition of claim 10 wherein the molar ratio of the isocyanate groups in the polyisocyanate compound to the hydroxyl groups in the polyhydric hydroxyl compound is in the range of 6:4 to 4:6.

15. A polyurethane adhesive composition comprising a polyisocyanate compound obtained from hexamethylene diisocyanate and containing not more than 0.5% by weight of hexamethylene diisocyanate monomer, 21 to 60% by weight of uretidine dione dimer and 11 to 40% by weight of isocyanurate cyclic trimer, the uretidine dione dimer and the isocyanurate cyclic trimer being prepared from a product obtained by urethane modification of 0.5 to 15 mole % of total isocyanate groups of hexamethylene diisocyanate before or during dimer and trimer formation by an alcohol having at least two hydroxyl groups and a branched hydrocarbon group consisting of two side chains, wherein the branched hydrocarbon group has a total of 4 to 35 carbon atoms, 2 to 33 of which carbons are present in the two side chains, and a polyhydric hydroxyl compound, where a molar ratio of isocyanate groups in the polyisocyanate compound to hydroxyl groups in the polyhydric hydroxyl compound is in a range of 9:1 to 1:9.

16. The polyurethane adhesive composition of claim 15 wherein the alcohol is dihydric and further wherein the alcohol has a molecular weight of 100 to 1,000.

17. The polyurethane adhesive composition of claim 15 wherein the polyhydric hydroxyl compound is selected from the group consisting of saturated polyester resin, unsaturated polyester resin, oil-modified alkyd resin, fatty acid-modified alkyd resin, oil-modified acrylic resin and fatty acid-modified acrylic resin.

18. The polyurethane adhesive composition of claim 15 wherein the molar ratio of the isocyanate groups in the polyisocyanate compound to the hydroxyl groups in the polyhydric hydroxyl compound is in the range of 6:4 to 4:6.

* * * * *